H. CSANYI.
SIGNAL APPARATUS.
APPLICATION FILED JULY 6, 1914.

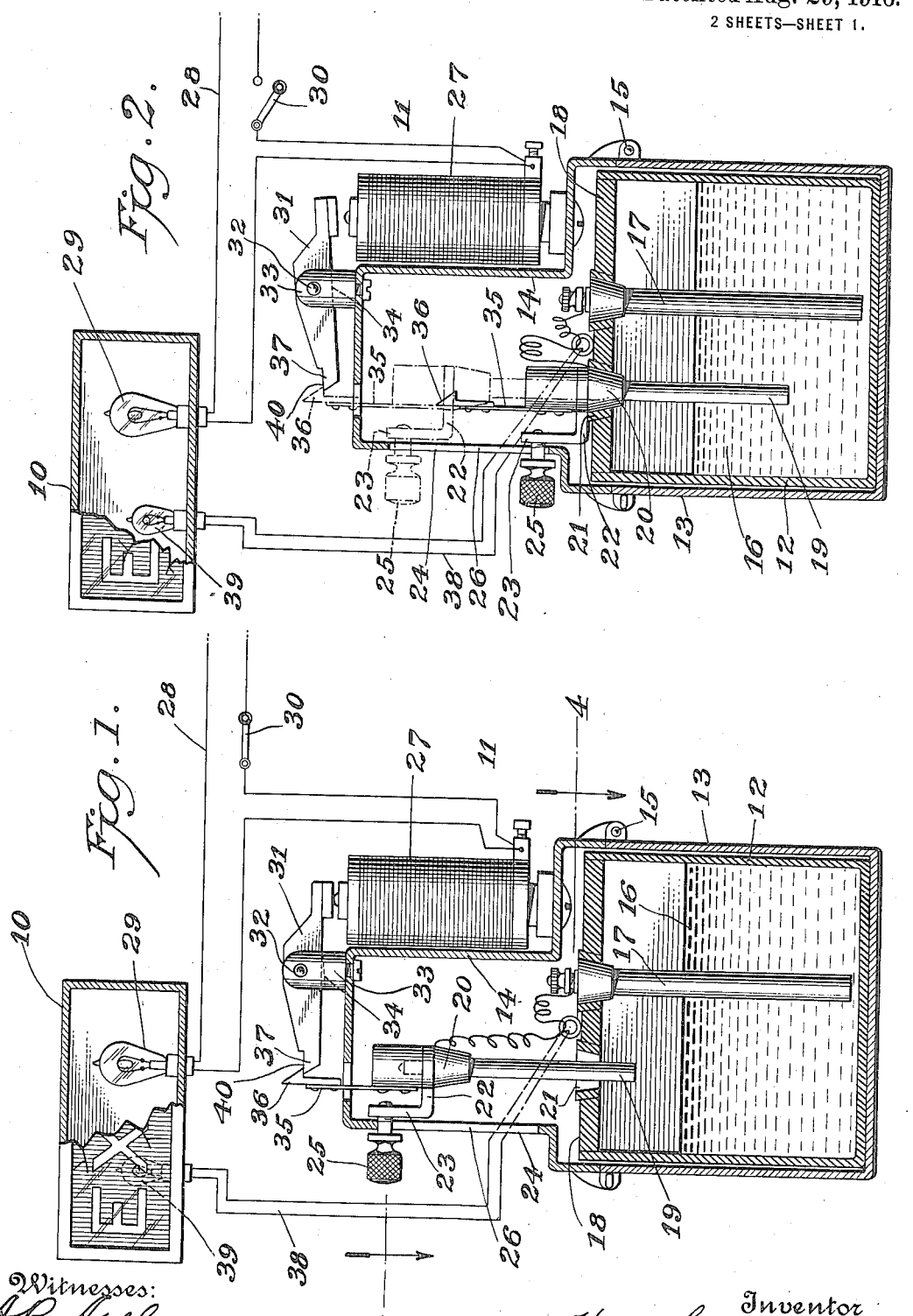

1,196,211.

Patented Aug. 29, 1916.
2 SHEETS—SHEET 2.

Witnesses:
A. R. Appleman
W. H. Hawkins

Inventor
Henry Csanyi,
By his Attorneys
Meyers, Cushman & Rea

UNITED STATES PATENT OFFICE.

HENRY CSANYI, OF NEW YORK, N. Y., ASSIGNOR TO MAXIVOLT PRIMARY BATTERY CO., OF NEW YORK, N. Y., A CORPORATION OF NEW JERSEY.

SIGNAL APPARATUS.

1,196,211.        Specification of Letters Patent.      Patented Aug. 29, 1916.

Application filed July 6, 1914. Serial No. 849,347.

*To all whom it may concern:*

Be it known that I, HENRY CSANYI, a citizen of the United States, residing at New York, in the county of New York and State of New York, have invented new and useful Improvements in Signal Apparatus, of which the following is a specification.

This invention relates to signals, and while it is applicable to signal systems in general, the embodiment of the invention which I have set forth in the specification involves the application of the invention to a simple annunciator.

A principal object of the invention is to provide a signal system arranged in such a way that upon the failure or inactivity of one signal, another signal automatically becomes active or energized.

A further object of the invention is to provide such a signal system in which the automatically operating signal is energized from a source of electro-motive force which is independent of the supply of electro-motive force for the first signal, and to arrange this apparatus in such a way that its independent source of electro-motive force is normally inactive but is automatically brought into operation to energize the automatically operating signal.

The apparatus preferably includes a primary battery, and one of the objects of the invention is to arrange the mechanism so that one of the elements of this primary battery is normally held withdrawn from the electrolyte so that the battery is inactive, and a further object of the invention is to arrange this mechanism so that upon the cessation of the first signal this battery element is permitted to enter the electrolyte and energize the automatic signal.

Further objects of the invention will appear more fully hereinafter.

The invention consists in the general combination of parts and simplicity of details hereinafter described, all of which contribute to produce an effective signal apparatus.

A preferred embodiment of my invention will be particularly described in the following specification, while the broad scope of my invention will be pointed out in the appended claims.

Figure 3:
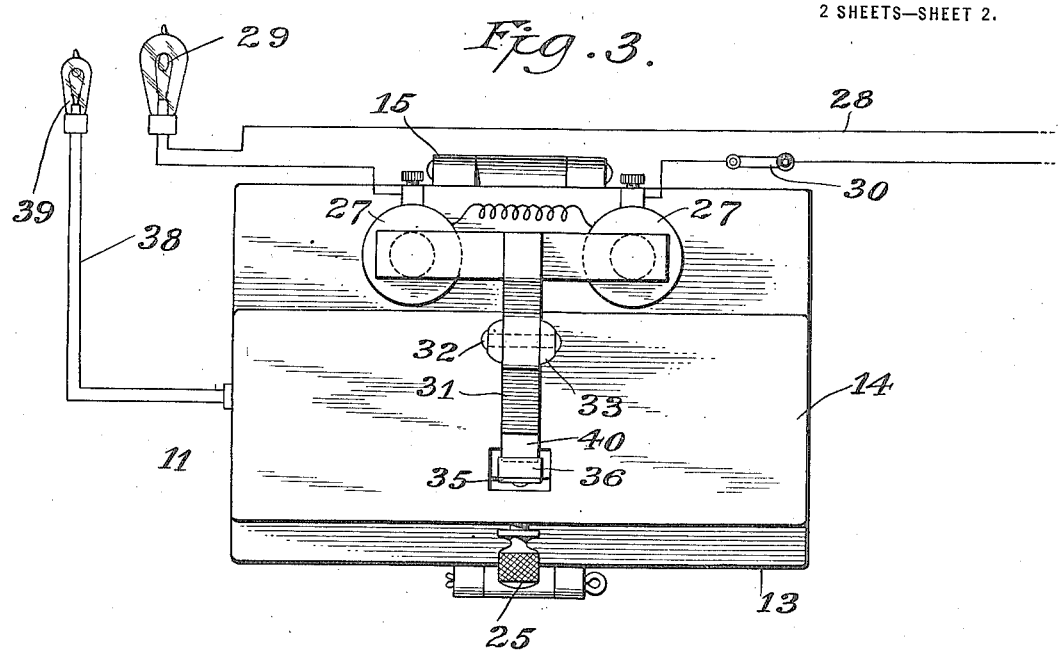
Figure 4:
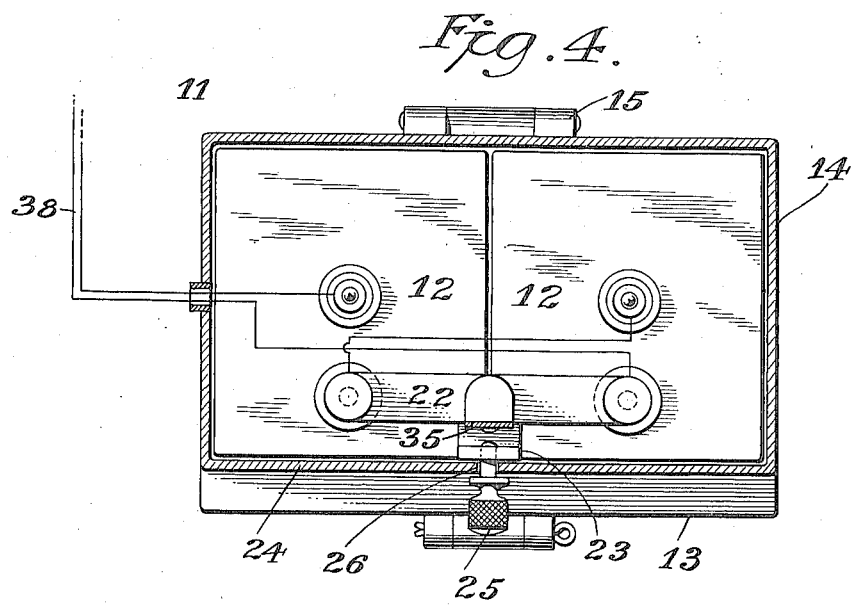

In the drawings: Figure 1 is a partial section through the apparatus and illustrating the arrangement and wiring thereof. This view shows the pole element withdrawn from the electrolyte, which is its condition when the first or main signal is in operation. Fig. 2 is a view similar to Fig. 1 but showing the main signal inactive and showing the pole element in the electrolyte to energize the automatic signal. Fig. 3 is a plan of a principal part of the apparatus and diagrammatically showing the relation of the signals and the wiring Fig. 4 is a vertical section taken on the line 4—4 of Fig. 1 and further illustrating the wiring arrangement.

Before proceeding to a detail description of the invention, it will facilitate the disclosure to state that I have illustrated the invention as applied to an annunciator such as an exit sign of a theater. In many cities the law requires that special precautions be taken to insure that the signal is always lighted so that it will be plainly seen. In applying my invention to such an annunciator, I provide two signals one of which is the normally active or main signal and is most conveniently energized by the regular electric-light service line. The second signal is arranged so as to illuminate the annunciator or sign and the apparatus is so arranged that upon the failure of the first or main signal, this second signal will be automatically lighted by current from another source such as a local battery. The signal control apparatus is preferably arranged so that the auxiliary circuit is normally held open; when the main circuit is closed it automatically sets the control apparatus so that if the main circuit should fail thereafter the auxiliary circuit will close automatically. This enables the apparatus when not in use to be left with both circuits open.

Referring more particularly to the parts, 10 represents an annunciator such as that referred to above which may be used in a theater or similar place to indicate an exit. At a convenient point, I provide a signal control apparatus 11 which preferably comprises a battery which may consist of two cells 12, said cells being placed in a case 13. This case is preferably formed with a cover 14 which may be hinged at 15 so as to permit the cover to swing open to give access to the interior of the case.

The cells 12 may, for example, form a primary battery preferably including a liquid electrolyte 16 and fixed pole elements 17 which hang down from the caps 18 of the cells into the electrolyte.

I provide a movable circuit closing member preferably in the form of the other pole elements 19 which may be the zinc elements of the cells, and preferably arranged so as to move into and out of the electrolyte; for this purpose I prefer to provide substantially conical heads 20 on the upper ends of these elements which seat in the conically bushed openings 21 in the caps of the cells. When these pole pieces are down, they dip in the electrolyte as illustrated in Fig. 2, the conical heads 20 being received in the bushed openings 21. The elements 19 are preferably attached to a common cross head 22 which is preferably provided with an extension 23 for guiding it on the inner side of the forward wall 24 of the cover 14 and this extension 23 is preferably provided with a removable thumb screw 25 the threaded stem of which passes through a vertical slot 26 in the forward wall of the cover. The slot permits the cross head 22 to be raised or lowered so as to withdraw the elements 19 from the electrolyte. Evidently the elements may be raised out of the electrolyte when desired by means of the thumb head 25.

I prefer to provide electro-magnetic means for controlling the pole elements 19. This is preferably accomplished by providing an electro-magnet 27 on the side of the cover, said electro-magnet having its coils connected in the main supply circuit 28 which supplies the main signal or normal signal 29 in the annunciator 10. The circuit 28 is supposed to represent part of the regular electric light circuit of the theater. This circuit includes a switch 30 which is closed when the signal 29 is to be active.

I provide detaining means for holding the auxiliary circuit open before the main circuit is closed. The detaining means may be in the form of a movable part the movement of which is controlled by the electric current in the main line, and this part controls the closing or opening of the auxiliary signal circuit. For this purpose, above the electro-magnet 27 I prefer to provide a movable part in the form of an armature 31 consisting of a lever having its fulcrum at 32 on a suitable post 33, said post having an inclined face 34 just under the lever for limiting the rocking movement of the armature away from the magnet. This extreme position of the armature when released by the magnet is illustrated in Fig. 2.

I provide means for supporting the elements 19 out of the electrolyte through the medium of the armature 31. For this purpose, I prefer to provide the cross head 22 with an upwardly extending flexible stem 35 which stem is preferably formed of a flat piece of resilient metal arranged so that it can be flexed toward the armature or away from the armature. The upper portion of this stem 35 carries a rigid hook 36 which projects toward the rear extremity or tail 37 of the armature.

The poles of the battery 11 are connected by a suitable or auxiliary circuit 38 with an auxiliary or automatic signal 39 which may also consist of an electric lamp arranged in the annunciator as illustrated. Any suitable wiring connection for the cells may be employed.

The mode of operation of the apparatus will now be described.

Supposing that the switch 30 is open as illustrated in Fig. 2, such as in the evening before the annunciator is in use; at such time, the pole elements 19 will be supported in an elevated position, indicated by the dotted outline in Fig. 2, the hook 36 engaging the end of the tail 37 of the armature, and as will be seen by reference to Fig. 1, this tail end 37 of the armature operates as a holding means to insure the auxiliary circuit remaining open before the main circuit is closed by the closing of the switch 30. When the elements 19 are supported at this elevation, of course, the battery is inactive. When the switch 30 is closed, the electro-magnet 27 becomes energized and places the circuit closing member in a set position, or condition, such that when the main current fails the circuit closing member will automatically close the auxiliary circuit. The magnet attracts the armature 31 which raises the tail 37 and further elevates the pole pieces 19. In this particular embodiment of the invention the armature maintains its engagement with the hook when the apparatus is changed to its set position. If, for any reason, the signal 29 should fail, such for instance as by burning out of the lamp or by a failure of the current in the circuit 28 or by an accidental opening of the switch 30, the magnet 27 will be deënergized; the weight of the cross head 22 and the elements 19 will then rock the armature 31 toward the position illustrated in Fig. 2. The momentum of the elements and their attached parts coöperating with the flexible connection formed by the stem 35, will operate to release the hook at this moment from the tail 37 so that the elements 19 will descend into the electrolyte and this energizes the circuit 38 and the signal 39. Special attention is called to the fact that although the armature 31 will support the elements in this position if the hook 36 is gently engaged with the armature, the armature will not support the elements when it comes to this position suddenly, as when released by the electro-magnet. This peculiar coöperation of the armature and the hook depends somewhat upon the fact that the amount of engagement between the hook and the armature is very small, but the action depends also somewhat upon the fact that the upper edge or supporting face 40 of the armature which engages the hook is slightly inclined to the horizontal when the armature is in the extreme position shown in Fig. 2. If the engagement between the hook and the armature is not sufficiently sensitive, it can be made more sensitive by increasing the inclination of the edge 40 with respect to a horizontal line; by doing this, the tendency of the hook to slip off the end of the armature is increased. However, the inclination need be very slight indeed in order to accomplish the desired effect. Attention is called to the fact that with this arrangement the descent of the elements 19 into the electrolyte accomplishes the function of a switch in the circuit 38, but with this advantage, that by withdrawing the elements from the electrolyte, a certain corrosion which usually occurs is prevented.

Although I have represented the signals in the annunciator as lamps, it is evident that the invention is applicable to other signals such as bells or any other character of signal or electric translating device; furthermore, the signals or such translating devices need not necessarily be located near each other.

Although I have illustrated only one main signal and one automatic signal, in connection with the controlling apparatus, it is evident that in practice the control apparatus may be used for controlling an entire system of such signals. This is merely a method of wiring and has therefore not been illustrated.

It is understood that the embodiment of the invention described above is only one of the many embodiments or forms that the invention may take, and I do not wish to be limited in the practice of my invention nor in my claims to the particular embodiment set forth.

What I claim is:—

1. In a signaling system, a main circuit including a main signal, an auxiliary circuit including an auxiliary signal, means for holding the auxiliary circuit open prior to the closing of the main circuit, an electro-magnet independent of the holding means and controlled by the main circuit for maintaining said auxiliary circuit open while the main circuit is closed, and an armature member associated with said electro-magnet, said magnet operating to release the armature to permit the closing of the auxiliary circuit when the current in the main circuit fails.

2. In a system of the character described, a main line circuit including a lamp, an auxiliary circuit including a lamp, a local source for the auxiliary circuit consisting of a battery having one of its pole elements movable into and out of the battery cell, means for holding said pole element out of the cell, and means operating automatically upon breaking of the main line circuit for operating the said holding means to permit the battery element to enter the cell and thus complete the auxiliary circuit through its lamp.

3. In a system of the character described, a main line circuit including a lamp, an auxiliary circuit including a lamp, a local source for the auxiliary circuit consisting of a battery having one of its pole elements movable into and out of the battery cell, means for holding said pole element out of the cell, and electro-magnetic means in the main circuit operating automatically upon breaking of the main line circuit for operating the said holding means to permit the battery element to enter the cell and thus complete the auxiliary circuit through its lamp.

4. In a system of the character described, a main line circuit including a lamp, an auxiliary circuit including a lamp, a local source for the auxiliary circuit consisting of a battery having one of its pole elements movable into and out of the battery cell, means for holding said pole element out of the cell, and means operating automatically upon breaking of the main line circuit for operating the said holding means to permit the battery element to enter the cell and thus complete the auxiliary circuit through its lamp.

5. In a signal system, in combination, a signal, a source of electro-motive force in circuit therewith, a second signal having an independent source of electro-motive force, a movable member, electro-magnetic means in circuit with said second signal for controlling said movable member and a second movable member controlled by said first movable member and controlling the circuit through said first signal and its source of electro-motive force.

6. In a signal system in combination, a signal, a primary battery in circuit therewith including a cell with an electrolyte and an element movable in and out of the said electrolyte, a second signal in a second circuit, an electro-magnet in said other circuit and an armature coöperating with said electro-magnet and adapted to hold said element out of the electrolyte while said second signal is active, said magnet operating to effect the release of said element and permit the same to move into the electrolyte when said electro-magnet is deënergized.

7. In a signal system in combination, a signal, a primary battery in circuit therewith including a cell with an electrolyte and an element movable in and out of the said electrolyte, a second signal in a second circuit, an electro-magnet in said second circuit, an armature controlled thereby, said movable element having means for engaging said armature to hold said element out of the electrolyte, said means being arranged to release said movable element upon the deenergizing of said electro-magnet.

8. In a signal system in combination, a signal, a primary battery in circuit therewith including a cell with a liquid electrolyte and an element movable in and out of the same, a second signal, a second circuit passing through said second signal, an electro-magnet in said second circuit, an armature for said electro-magnet and a hook carried by said movable element and adapted to engage said armature to hold said element out of the electrolyte before said electro-magnet is energized, means for closing said second circuit to energize the magnet, said hook being arranged to release itself when said magnet is deënergized.

9. In a signal system in combination, a primary battery therefor including a cell with a liquid electrolyte and an element movable in and out of the electrolyte liquid, a second signal in a second circuit, an electro-magnet in said second circuit, an armature for said electro-magnet, a hook having a flexible connection with said movable element for supporting said element on said armature before the said magnet is energized, means for closing said second circuit to energize the magnet, said flexible connection being arranged to release said hook from said armature only when said magnet is deënergized.

10. In a signal system in combination, a signal, a primary battery in circuit therewith including a cell with a liquid electrolyte and an element movable substantially vertically into and out of said electrolyte, means for guiding said movable element up and down, a second signal in a second circuit, a switch in said second circuit for opening and closing the same, an electro-magnet in said second circuit, an armature for said electro-magnet, a hook for engaging said armature, a flexible stem connecting said hook with said element and arranged to support said element out of the electrolyte and arranged to maintain its supporting connection with said armature when said electro-magnet is energized by the closing of said switch, said flexible stem, when said magnet is deënergized being adapted to flex away from said armature and release said element to permit it to return to said electrolyte.

11. In a signal system in combination, a signal, a battery therefor including a liquid electrolyte and an element movable into and out of the electrolyte liquid, a second signal in a second circuit, an armature for said electro-magnet, a hook connected with said movable element, means for holding said armature in a certain position to engage said hook and hold said movable element elevated out of the liquid, means for closing said second circuit to energize the magnet to attract said armature and further elevate said element, said hook and armature being arranged to maintain their engagement when said electro-magnet becomes energized and said further elevating movement occurs, said hook and armature being arranged to disengage the said hook in the said certain position of the armature when said armature is released by the deënergizing of said magnet, and moves to said certain position.

12. In a signal apparatus in combination, a main circuit including an electro-magnet and a main signal, an auxiliary circuit including an auxiliary signal, an armature for said magnet, a member having a hook and arranged to close said auxiliary circuit, said armature having an edge adapted to engage said hook to support said member and maintain said auxiliary circuit open, said edge being inclined to the horizontal and said hook having a flexible connection with said member to release said hook from said armature when said magnet is deënergized.

13. In a signaling system, a main line circuit including a main signal, an auxiliary circuit including an auxiliary signal, said circuits having independent sources of electro-motive force, a member tending to close said auxiliary circuit, detaining means for preventing said member from closing said auxiliary circuit before the main circuit is closed, and electro-magnetic means in said main circuit operating to detain said member by electro-magnetic force while the main circuit is closed and permit said member to move and close the auxiliary circuit when the main circuit current fails.

In testimony whereof I have hereunto set my hand in presence of two subscribing witnesses.

HENRY CSANYI.

Witnesses:
J. GRANVILLE MEYERS,
AGNES DE MOTT.